US012651538B2

(12) United States Patent
Achsnich et al.

(10) Patent No.: US 12,651,538 B2
(45) Date of Patent: Jun. 9, 2026

(54) MULTIFUNCTIONAL LABEL, SYSTEM AND METHOD FOR MANUFACTURING A MULTIFUNCTIONAL LABEL

(71) Applicant: Schreiner Group GmbH & Co. KG, Oberschleissheim (DE)

(72) Inventors: Melanie Achsnich, Munich (DE); Dirk Probian, Meitingen (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 350 days.

(21) Appl. No.: 18/211,768

(22) Filed: Jun. 20, 2023

(65) Prior Publication Data

US 2023/0419865 A1 Dec. 28, 2023

(30) Foreign Application Priority Data

Jun. 28, 2022 (DE) ..................... 10 2022 116 021.1

(51) Int. Cl.
*G09F 3/03* (2006.01)
*B32B 3/26* (2006.01)
(Continued)

(52) U.S. Cl.
CPC ............... *G09F 3/03* (2013.01); *B32B 3/266* (2013.01); *B32B 7/12* (2013.01); *B32B 37/12* (2013.01);
(Continued)

(58) Field of Classification Search
CPC ................. G09F 3/03; G09F 2003/023; G09F 2003/0257; G09F 2003/0269; G09F 2003/0272
See application file for complete search history.

(56) References Cited

U.S. PATENT DOCUMENTS 7,034,689 B2 4/2006 Teplitxky et al.
10,035,624 B2 7/2018 Bauss
(Continued)

FOREIGN PATENT DOCUMENTS

DE 91 10 080 U1 9/1991
DE 197 20 747 C2 4/2003
(Continued)

OTHER PUBLICATIONS

German Search Report dated Nov. 4, 2022 in German Application No. 10 2022 116 021.1, with English translation of relevant parts.
(Continued)

*Primary Examiner* — Gary C Hoge
(74) *Attorney, Agent, or Firm* — Collard & Roe, P.C.

(57) ABSTRACT

A multifunctional label for a multi-part container has a transponder inlay with an electronic unit and a detection loop, which are arranged on a carrier layer of the transponder inlay and are coupled to one another in terms of signalling. The carrier layer has a predetermined local material weakening in the area of the detection loop. The multifunctional label further includes a label with at least one label layer which has a predetermined introduced local material weakening. The transponder inlay and the label layer are directly or indirectly coupled to one another, so that the material weakening of the label layer and the material weakening of the carrier layer overlap at least in sections with respect to a lateral extent of the multifunctional label.

14 Claims, 6 Drawing Sheets

(51) Int. Cl.

| | | |
|---|---|---|
| *B32B 7/12* | (2006.01) |
| *B32B 37/12* | (2006.01) |
| *B32B 38/04* | (2006.01) |
| *B65D 25/20* | (2006.01) |
| *C09J 201/00* | (2006.01) |
| *G06K 19/077* | (2006.01) |
| *G09F 3/02* | (2006.01) |

(52) U.S. Cl.
CPC ............ *B32B 38/04* (2013.01); *B65D 25/205* (2013.01); *C09J 201/00* (2013.01); *G06K 19/07773* (2013.01); *B32B 2038/042* (2013.01); *B32B 2038/045* (2013.01); *B32B 2038/047* (2013.01); *B32B 2310/0843* (2013.01); *B32B 2519/02* (2013.01); *G09F 2003/023* (2013.01); *G09F 2003/0257* (2013.01); *G09F 2003/0269* (2013.01); *G09F 2003/0272* (2013.01)

(56) References Cited

U.S. PATENT DOCUMENTS

| | | | | |
|---|---|---|---|---|
| 2009/0291240 A1* | 11/2009 | Moosheimer | ...... | G06K 19/0776 |
| | | | | 428/34.1 |
| 2009/0315320 A1 | 12/2009 | Finn | | |
| 2011/0266351 A1* | 11/2011 | Wagner | ............ | G06K 19/07749 |
| | | | | 438/108 |
| 2011/0313894 A1* | 12/2011 | Dye | ........................... | G09F 3/03 |
| | | | | 705/28 |

| | | | | |
|---|---|---|---|---|
| 2019/0135501 A1 | 5/2019 | Chandra et al. | | |
| 2019/0138864 A1* | 5/2019 | Reyland | ........... | G06K 19/07798 |
| 2019/0270567 A1* | 9/2019 | Caleman, Jr. | ............. | B32B 7/12 |
| 2022/0076093 A1 | 3/2022 | Escaro | | |
| 2022/0180143 A1* | 6/2022 | Rehm | ................ | G06K 19/0776 |
| 2022/0230045 A1 | 7/2022 | Backhaus et al. | | |
| 2023/0023532 A1* | 1/2023 | Oetzel | ................... | G09F 3/0292 |
| 2023/0410691 A1* | 12/2023 | Ambartsoumian | ....... | G09F 3/10 |
| 2024/0046059 A1* | 2/2024 | Hofenauer | ....... | G06K 19/07758 |
| 2025/0197062 A1* | 6/2025 | Higuchi | ................ | G09F 3/0376 |

FOREIGN PATENT DOCUMENTS

| | | |
|---|---|---|
| DE | 10 2012 112 297 A1 | 6/2014 |
| DE | 20 2015 106 091 U1 | 11/2015 |
| DE | 10 2019 108 253 A1 | 10/2020 |
| DE | 10 2020 133 546 A1 | 6/2022 |
| EP | 1 402 470 B1 | 6/2014 |
| EP | 2 847 082 B1 | 9/2016 |
| EP | 2 960 834 B1 | 3/2019 |
| WO | 2006/087999 A1 | 8/2006 |
| WO | 2020/234209 A1 | 11/2020 |
| WO | 2021/032799 A1 | 2/2021 |
| WO | 2021/099353 A1 | 5/2021 |

OTHER PUBLICATIONS

European Search Report dated Nov. 14, 2023 in European Application No. 23180639.9-1201, with English translation of relevant parts.

* cited by examiner

22

22

22

22

22

MULTIFUNCTIONAL LABEL, SYSTEM AND METHOD FOR MANUFACTURING A MULTIFUNCTIONAL LABEL

CROSS REFERENCE TO RELATED APPLICATIONS

Applicant claims priority under 35 U.S.C. § 119 of German Application No. 10 2022 116 021.1 filed Jun. 28, 2022, the disclosure of which is incorporated by reference.

BACKGROUND OF THE INVENTION

1. Field of the Invention

The present invention relates to a multifunctional label which provides reliable protection for a content of a container in a simple and cost-effective manner. The invention further relates to a system comprising such a multifunctional label and a method for producing such a multifunctional label.

2. Description of the Related Art

Labels can be used for authorization or proof of origin and can be used wherever it is necessary to identify or verify objects. Some labels have functions which, for example, on the basis of electronic components, enable convenient location and electronic recording of information on the labels and information provided with them. Labels may also provide privacy protection or proof of opening.

SUMMARY OF THE INVENTION

It is an objective underlying the invention to provide a multifunctional label which can be produced in a simple and cost-effective manner and which provides reliable protection for the contents of a container.

The objective is achieved by the features according to the invention. Advantageous embodiments are indicated below. According to one aspect of the invention, a multifunctional label for a multi-part container comprises a transponder inlay with an electronic unit and a detection loop, which are arranged on a carrier layer of the transponder inlay and are coupled to one another by means of signalling. The carrier layer has a predetermined local material weakening in the area of the detection loop. The multifunctional label further comprises a label with at least one label layer which also has a predetermined introduced local material weakening. The transponder inlay and the label or the carrier layer and the label layer are directly or indirectly coupled to one another, so that the material weakening of the label layer and the material weakening of the carrier layer overlap at least in sections with respect to a lateral extent and in the viewing direction along a stacking direction of the multifunction label.

By means of the described multifunctional label, a reliable protection, for example for pharmaceutical products, can be realized in a simple and cost-effective way. The material weakenings form a respective area in which the associated layers can be severed in a controlled manner, so that an initial opening is optically visible and electronically measurable. The transponder inlay provides an electronic or digital initial opening indication and the label provides an optical or analogue initial opening indication. The multi-function label thus realizes a tamper-evident label with a combined opening principle.

It is a finding in connection with the present invention that pharmaceutical products, in particular biotechnologically produced medicinal products, should be reliably protected against manipulation. In addition, many pharmaceutical products require a first-opening indication as a safety aspect. By means of the described configuration of the multifunctional label, a digital first-opening function is integrated into a label with simultaneous optical indication. The opening and triggering of the control function is preferably designed in such a way that, compared to conventional labels, no significant increase in force is required for opening.

The material weakening of the carrier layer is done, for example, by means of a laser. Laser radiation can be used to precisely remove or destroy material from the carrier layer in order to set up a desired weakening structure on and/or in the carrier layer. For example, the material weakening of the carrier layer may comprise a plurality of circular, columnar and/or angular recesses. One or more such recesses may be formed on the surface or penetrate the carrier layer. Alternatively or additionally, recesses or weakenings may be provided in the carrier layer to form or co-form the local material weakening.

The material weakening of the carrier layer is preferably formed with respect to a depth along the stacking direction of the multifunctional label in coordination with a thickness of the carrier layer, a shape of the detection loop and/or a shape of the electronic unit. Furthermore, material weakening of the carrier layer in relation to the lateral extension can be formed in particular in a planar manner. In each case, material weakening of the carrier layer is assigned to a predetermined area adjacent to the detection loop. Material weakening can, for example, be formed continuously below the detection loop or also have several sections. The material weakening can extend over an entire width of the carrier layer or be provided proportionally.

The material weakening of the label layer can also be formed over an area. Alternatively, the material weakening of the label layer is line-shaped or, in particular, has line-shaped elements. The material weakening of the label layer is in particular formed as a perforation, a slit and/or a punching and provides a predetermined tearing direction of the label layer. In particular, the material weakening of the label layer is designed to be penetrating with respect to a depth.

The previously described extensions and directions of the multifunctional label refer to usual dimensions of a stack structure of a label. The transponder inlay and the label are arranged directly or with one or more intermediate layers on top of each other and thus define the stacking direction of the multifunctional label. Along the stacking direction, respective thicknesses of existing elements and depths of material weakenings are indicated. Perpendicular to this, the lateral extent of the multifunctional label is indicated, which is usually predominant. Within such a lateral main plane of extension, widths or lengths of respective elements are to be applied.

According to a further embodiment, the material weakening of the label layer in relation to the lateral extension is such that it covers at least 50% of an extension of the material weakening of the carrier layer. In this way, a particularly reliable double first-opening indication can be provided, in which the carrier layer and the label layer tear together simultaneously or promptly one after the other during an opening process of the container to which the multifunctional label is operationally attached. The material weakening of the label layer may, for example, be formed as a wave-shaped perforation longer than the material weakening of the carrier layer lying below or above it. In relation to a top view or a view from below, in each case along the stacking direction, the material weakenings overlap at least in sections. The material weakenings can also be formed in such a way that they completely overlap or largely overlap.

According to an embodiment, the multifunctional label has an adhesive layer arranged between the carrier layer and the label layer. In the area of material weakening between the carrier layer and the label layer, an adhesive-free, adhesive-neutral or adhesive-reduced area is preferably formed. The adhesive layer can, for example, be applied in sections to an underside of the label layer, which is then bonded to the transponder inlay. An adhesive-free area can be provided in the area of the interconnected material weakenings in order to enable particularly easy opening of the container and tearing of the multifunctional label. However, the adhesive layer can also be completely applied and its adhesive properties neutralized or reduced by means of an adhesive weakening agent. An adhesive weakening agent makes it possible for the adhesive layer to be weakened in predetermined sections and for the carrier layer and the label layer not to be coupled to each other or to be coupled to each other with reduced adhesive in the region of the material weakenings. The area of material weakening is particularly intended for use in a transition area of the container, in which the container can be separated and thus opened.

The transponder inlay and the label are therefore preferably formed in coordination with the container to which the multifunctional label is to be applied. For example, with respect to an applied state of the multifunctional label on the container, the transponder inlay and the label are configured such that the carrier layer and the label layer are coupled in sections to a first part and a second part of the container, the parts of the container being releasably coupled to each other and removable from each other during an opening operation. The material weakenings of the carrier layer and of the label layer are accordingly associated with a transition between the first and the second part of the container, so that, when the container applied with the multifunctional label is opened, the transponder inlay and the label can be cut through in a predetermined manner in the region of the material weakenings and a section of the carrier layer and a section of the label layer can be removed together with the first part from the second part of the container.

The described multifunctional label is therefore suitable for use, for example, on a pharmaceutical container, such as a syringe, injection vial or vial, to protect its contents against tampering and to provide a particularly secure and reliable first opening indication. The multifunctional label is also suitable for medical devices such as pens and auto-injectors. For example, when a cap is pulled off a syringe body of a syringe, the carrier layer and thus the detection loop is destroyed or damaged and stored as an event in a memory of the electronic unit. The electronic unit preferably comprises an antenna structure and an RFID chip, which are coupled with each other in terms of signalling technology and enable the digital proof of first opening to be read out. In addition, when the syringe is opened, the label layer is damaged or destroyed in a controlled manner, which also provides an analogue, optical proof of initial opening. Furthermore, the multifunctional label can also be set up to identify an object and, by means of the RFID functionality, enable a useful electronic identification of the object or container.

Further, the multifunctional label may comprise security features such as a void layer, for example, disposed in or coupled to the label layer. The void layer may be located, for example, below the label layer and above an adhesive layer with respect to the stacking direction. The void layer provides a void effect that provides tamper protection. For example, the void layer is implemented with two or more different adhesive strength structures or release gradations. For example, a more adhesive structure in the form of lettering is implemented in the void structure, while other sections of the void structure are less adhesive. If the void structure or the multifunctional label with a void layer is applied to an object to be marked, for example, when the multifunctional label is detached, the more adhesive writing remains stuck to the object, while the less adhesive sections are removed with the multifunctional label or a label section detached from the object. Alternatively, the structures described can also be reversed in terms of their adhesive strength, so that, for example, the structure in the form of a lettering is less adhesive.

Alternatively or additionally, security features can be provided in the form of punchings that establish a predetermined weakening structure of a layer of the multifunctional label. Thus, for example, tear positions can be provided at which the multifunctional label tears in a predetermined manner in the event of an attempt to manipulate or open the object to which it is applied. Alternatively or additionally, further perforations may also be provided in one or more layers of the multifunctional label, which enable a respective layer to be selectively torn through or opened.

Furthermore, it may be beneficial that the multifunctional label is formed as an all-round or over-all-round label in order to be able to cover as much surface of the container as possible, so that a reliable hold and/or as much additional protection as possible is provided by the multifunctional label. The multifunctional label can, for example, also be designed in such a way that, with a view to use on a syringe, it passes over the syringe shoulder to above the closure and closes the resulting sleeve above the closure. In this way, the shoulder and closure area of the syringe or container in general can also be additionally protected from the effects of light/UV radiation and against gas ingress. Alternatively or additionally, further functionalities, such as UV/light protection, a barrier protection film and/or an intended cryogenic application of the multifunctional label can also be taken into account, so that corresponding functionalities can be integrated with a suitable choice of an upper material of the label layer or of the multifunctional label and/or by a suitable choice of an adhesive. In particular, depending on the intended application, a specific choice of an adhesive may also be beneficial, for example selected with regard to cryogenic applications.

According to a further aspect of the invention, a system comprises an embodiment of the multifunctional label described above attached to an object or container. In particular, a surface of the object may form a substrate for the multifunctional label. For example, the surface of the object may be provided by an outer surface of a container, in particular by the jacket surface of a syringe or injection vial. In that the system comprises an embodiment of the multifunctional label described, properties and features of the multifunctional label are also disclosed for the system and vice versa. For example, the object of the system is realized as an injection vial, vial or syringe and the attached multifunctional label provides reliable protection and dual first opening indication for the pharmaceutical product stored therein. For example, the carrier layer and the label layer couple a syringe cap to a syringe body and, when the syringe is opened, the multifunctional label is cut in a predetermined manner in the area of the material weakenings and a section of the carrier layer as well as a section of the label layer together with the syringe cap are removed from the syringe body, on which remains of the transponder inlay, in particular the electronic unit, and remains of the label remain. An inverse application of the multifunctional label to the container is accordingly possible, so that for example the electronic unit of the transponder inlay remains for example on the syringe cap.

According to a further aspect of the invention, a method for producing a multifunctional label comprises providing a transponder inlay having an electronic unit and a detection loop, which are arranged on a carrier layer of the transponder inlay and are coupled to one another by means of signalling. The method further comprises forming a local material weakening in the carrier layer in the region of the detection loop. The method further comprises providing a label having at least one label layer, and forming a local material weakening in the label layer. The method further comprises coupling the transponder inlay and the label together so that the material weakening of the label layer and the material weakening of the carrier layer overlap at least in sections with respect to a lateral extent of the multifunctional label.

The formation of the local material weakening in the carrier layer can be carried out in particular by removing material of the carrier layer by means of a laser. The formation of the local material weakening in the label layer may in particular be performed by introducing a perforation, a slit and/or a punch in the label layer.

The method may further comprise providing an adhesive layer such that it is disposed between the carrier layer and the label layer and adhesively couples the transponder inlay and the label. The method may further comprise forming an adhesive-neutral or adhesive-reduced region between the carrier layer and the label layer in the region of material weakening.

In that the respective method is particularly configured for producing an embodiment of the multifunctional label described above, properties and features of the multifunctional label are also disclosed for the manufacturing method, and vice versa.

A processing of a plurality of multifunctional labels can be carried out in particular in a roll-to-roll process with a pre-roll and a post-roll process. In this process, material webs for the transponder inlay or carrier layer and for the label or label layer can be provided, processed and coupled together to form a plurality of multifunctional labels on a label roll. Printing, punching and/or cutting operations may also be performed, for example, to perform format and/or functional die-cutting. The electronic unit, for example, as well as the detection loop can be printed on the carrier layer and coupled with each other.

By means of the multifunctional label, a particularly reliable first-opening indication for a pharmaceutical container can be realized that combines both an electronic and an optical first-opening detection in one label and, moreover, can be produced in such a way that it can be separated with little effort. No additional die-cutting is required, which would require a relatively high amount of force to trigger a tamper function and possibly provide an undefined tear. The multifunctional label can be produced cost-efficiently and processed clearly.

The carrier layer realizes a substrate of the transponder inlay and is specifically weakened at one position. The material weakening of the inlay substrate is performed by a suitable selective process, preferably by means of a laser, so that only the substrate is damaged in a controlled manner while leaving the detection loop, an antenna material and electronic components of the transponder inlay undamaged. The material weakening in the inlay substrate can be integrated over an entire inlay web width or limited to one or more partial areas. At the same time, the material weakening can contribute to a reduction of adhesive forces in this area. The substrate no longer adheres or no longer adheres completely in this area to a substrate, whereby the unhindered or at least not impeded opening function can be formed.

The material weakening in the inlay substrate can be made in different geometric forms, such as by means of a circular, square or rectangular material removal, and can be inserted in different extensions. A depth of the material removal can be adapted to the antenna structure or the detection loop. The material weakening of the carrier layer can therefore also have a depth modulation. In particular, the material weakening in the label layer may be formed as a perforation structure with different geometrical shapes, such as sine-shaped, zipper-shaped, puzzle-shaped and/or as a simple line in the form of one or more cut-ridge perforations.

The detection loop forms a tamper loop and, for example, like the antenna structure of the RFID functionality, is formed as an aluminium, silver and/or copper conductor track that is connected in a self-contained manner to inputs of the electronics unit. The detection loop forms a sensor track which, due to the material weakening deliberately introduced in the inlay substrate, is destroyed or damaged in a predetermined manner in the event of opening, so that the electronic unit detects this and irreversibly digitally stores a corresponding opening event, for example until it is read out.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

Elements or features of the same construction or function are marked with the same reference signs across the figures. For reasons of clarity, not all of the elements or features shown in all of the figures are identified with the corresponding reference signs, possibly.

DETAILED DESCRIPTION OF PREFERRED EMBODIMENTS

Figure 1:
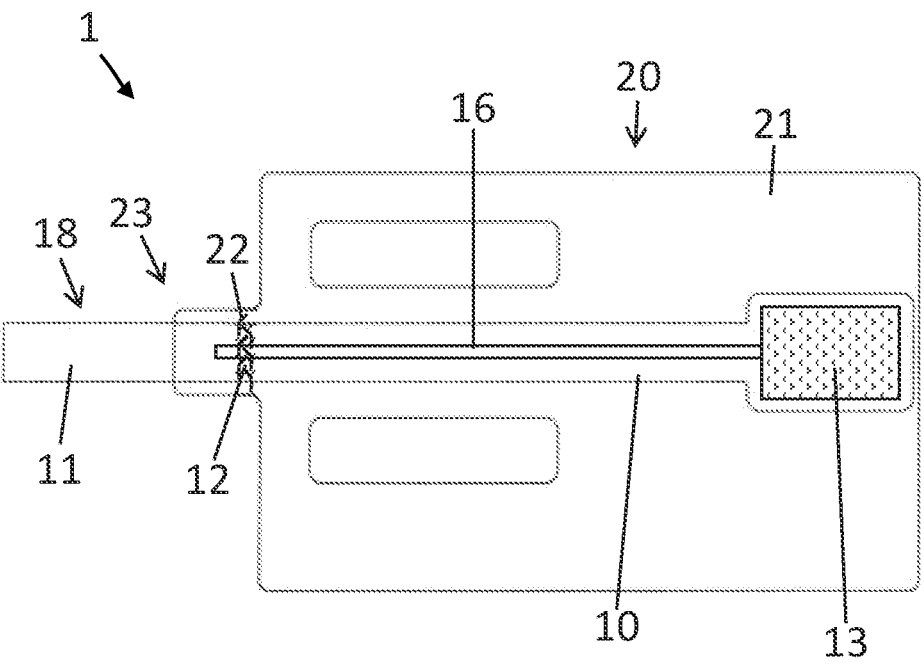
FIGS. 1-2 show embodiments of a multifunctional label in a respective top view.
Figure 2:
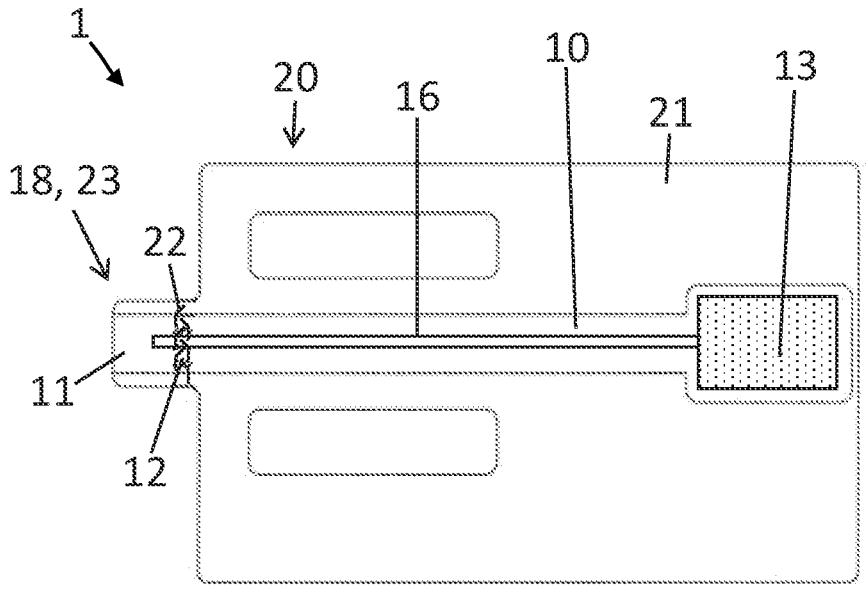

FIGS. 1-2 each show, in a schematic top view, embodiments of a multifunctional label 1 for a multi-part container. The multifunctional label 1 comprises a transponder inlay 10 and a label 20. The transponder inlay 10 comprises an electronic unit 13 and a detection loop 16, which are arranged on a carrier layer 11 of the transponder inlay 10 and are coupled to one another by means of signalling. The carrier layer 11 has a local material weakening 12 in the region of the detection loop 16, which is formed, for example, by means of a laser.

The label 20 comprises at least one label layer 21, for example in the form of a foil or paper element. The label layer 21 has a local material weakening in the form of a perforation 22. The transponder inlay 10 and the label layer 21 are directly or indirectly coupled to one another, so that the perforation 22 of the label layer 21 and the material weakening 12 of the carrier layer 11 overlap at least in sections with respect to a lateral extent L of the multifunctional label 1 (see also FIG. 13).

The label 20 is arranged, for example, on the transponder inlay 10 and coupled to it by means of an adhesive layer 25. With reference to a stacking direction R of the multifunctional label 1, the label 20 can also be referred to as the top label, which covers the transponder inlay 10. In this description, terms such as "top", "bottom", "upper side", "lower side", "above" and "below" refer to orientations or alignments of the respective elements as illustrated in the figures along the stacking direction R. A respective thickness of the illustrated layers therefore extends along the stacking direction R. The thicknesses of the respective layers of the multifunctional label 1 may be the same or different. The stacking direction R substantially corresponds to a surface normal of the surface of the container for which the multifunctional label 1 is provided. As will be explained below with reference to FIGS. 1-14, the multifunctional label 1 can be used to provide reliable protection for pharmaceutical products in a simple and cost-effective manner.

The transponder inlay 10 and the label 20 each have a protruding area 18, 23, which is formed in particular to match the container 30 to which multifunctional label 1 is to be attached. The projecting areas 18, 23 may be of the same size (see FIG. 2) or of different sizes (see FIG. 1). The container is realized, for example, as a syringe 30 with a syringe cap 31 and a syringe body 32 (see FIG. 13). When the syringe 30 is opened, the syringe cap 31 is removed from the syringe body 32, for example pulled off and/or twisted off. The multifunctional label 1 is attached to the syringe 30 in such a way that the protruding areas 18, 23 are attached to the syringe cap 31 and the respective remaining part of the transponder inlay 10 and the label 20 are attached to the syringe body 32, for example by means of an adhesive layer 17. The material weakenings 12 and 22 are associated with the transition between the syringe cap 31 and the syringe body 32 and form a respective area in which the carrier layer 11 and the label layer 21 can be severed in a controlled manner, so that a completed initial opening is both visually visible and electronically readable.

Figure 3:
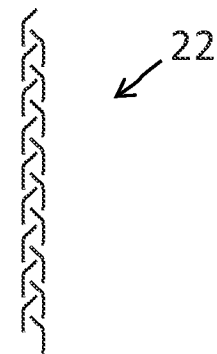
FIGS. 3-12 show embodiments of components or sections of the multifunctional label in various views.
Figure 4:
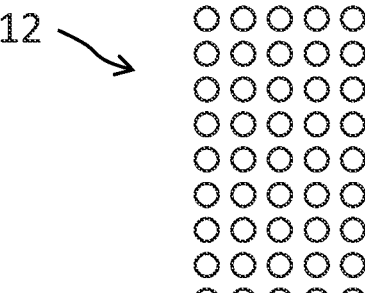
Figure 5:
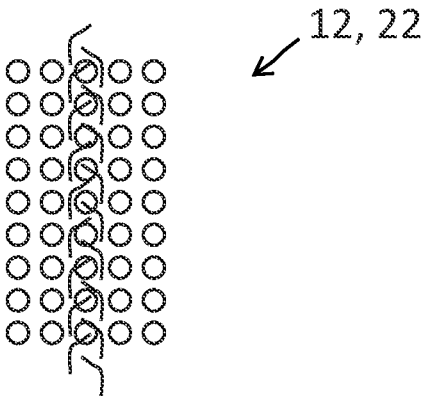

FIGS. 3-5 illustrate elements of the multifunctional label 1 that enable digital and analogue initial opening detection. FIG. 3 shows a perforation in the form of a zip fastener, which is formed, for example, by a plurality of slits and/or punchings. Alternatively or additionally, the perforation may be sinusoidal (see FIG. 8), double sinusoidal (see FIG. 9), S-shaped (see FIGS. 10 and 11) and/or jigsaw puzzle-shaped (see FIG. 12) or another shape.

FIG. 4 schematically shows an embodiment of the material weakening 12, which is formed, for example, by means of a laser in the form of a plurality of circular recesses. By means of the laser, material can be selectively removed at desired positions on and/or in the carrier layer 11, thereby forming the material weakening 12, which substantially specifies a predetermined tear point. FIG. 5 shows the overlap of the perforation 22 according to FIG. 3 and the material weakening 12 according to FIG. 4.

Figure 6:
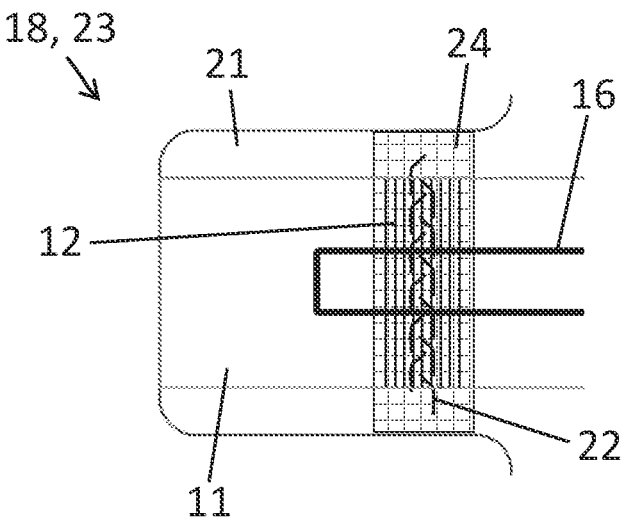

FIG. 6 shows a schematic view of the projecting areas 18 and 23. In the area of the material weakenings 12, 22, the multifunctional label 1 preferably has an adhesive-free or adhesive-neutral area 24. In this way, a low-effort opening of the container and tearing of the multifunctional label 1 with twofold initial opening proof can be set up. For example, the label layer 21 is designed as a plastic or film element or as a paper element and, when the syringe 30 is opened, first tears along the perforation 22 and then transfers the opening force to the underlying carrier layer 11, which is designed, for example, as a plastic film and tears along the material weakening 12.

Figure 7:
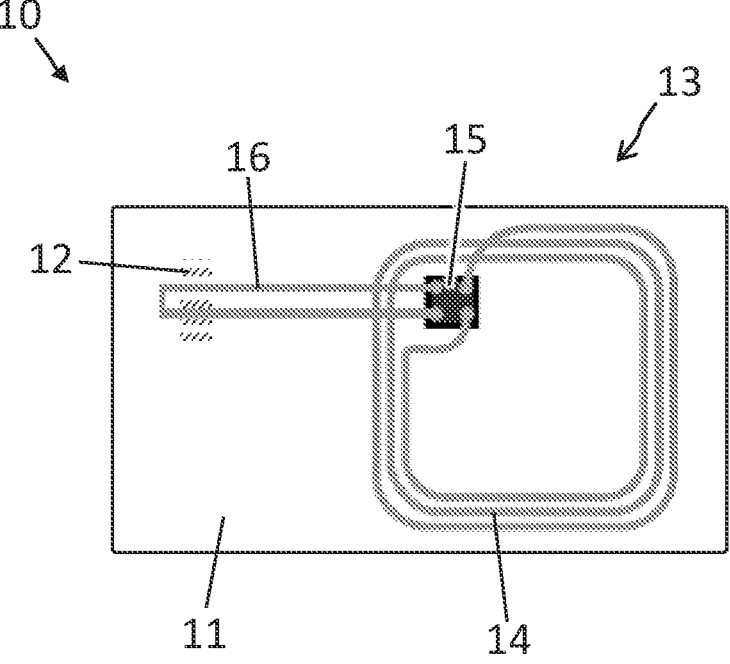
Figure 8:
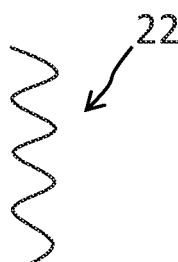
Figure 9:
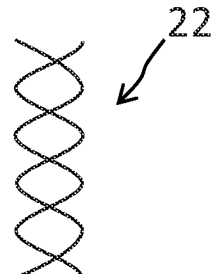
Figure 10:
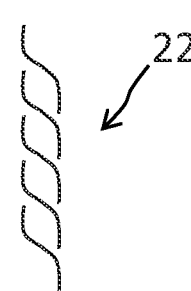
Figure 11:
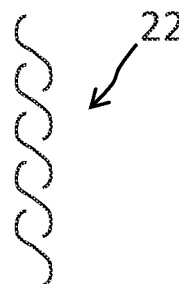
Figure 12:
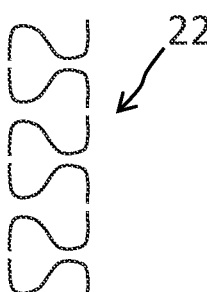

FIG. 7 shows a schematic top view of an embodiment of the transponder inlay 10. The electronic unit 13 comprises, for example, an antenna structure 14 and an RFID chip 15, which are coupled to one another in terms of signalling. Furthermore, the detection loop 16 is signal-coupled to two inputs of the RFID chip 15 and forms a self-contained tamper loop or sensor track. Accordingly, separate inputs are preferably provided for the detection loop 16 on the RFID chip 15. Damage to or destruction of the detection loop 16 can be detected by the RFID chip 15 due to an associated change in electrical resistance and stored as an opening event.

Figure 13:
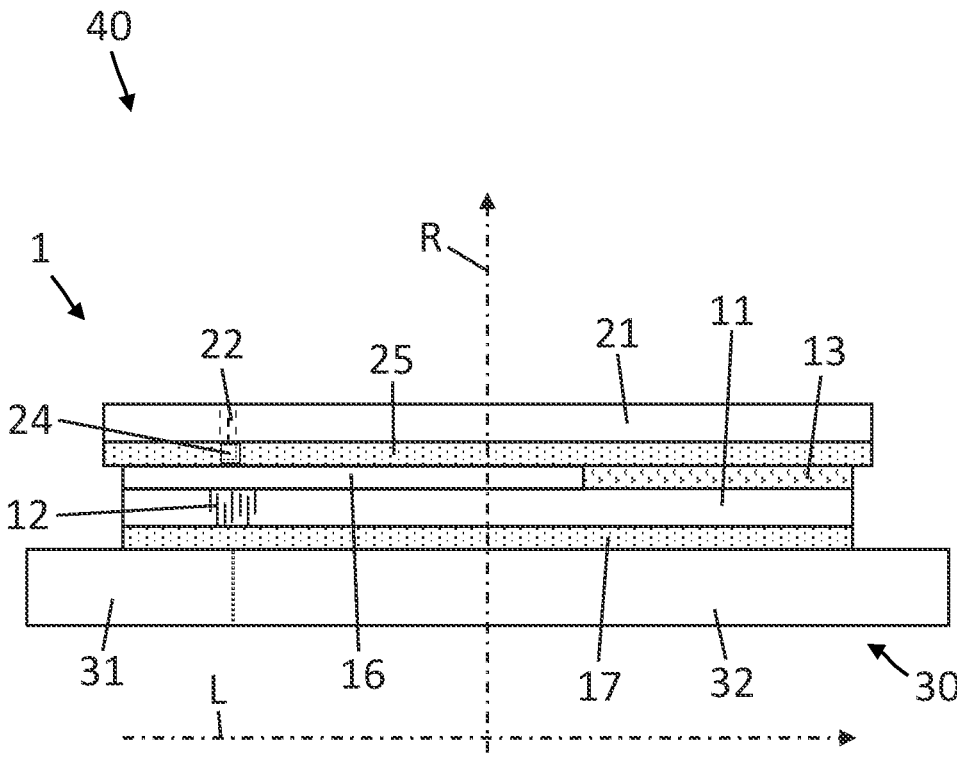
FIG. 13 shows a further embodiment of the multifunctional label in a schematic side view.

FIG. 13 illustrates in a schematic side view a system 40 with an embodiment example of the multifunctional label 1 arranged on a container or syringe 30. With respect to the stacking direction R, the label 20 is arranged on the transponder inlay 10, which is attached to a surface of a container or to the outer lateral surface of the syringe 30 by means of the adhesive layer 17, so that the material weakenings 12, 22 are associated with the transition between the syringe cap 31 and the syringe body 32. Accordingly, the label 20 forms an upper label and covers the transponder inlay 10 so that the perforation 22 and the material weakening 12 overlap. Preferably, the perforation 22 is formed and positioned in the top label such that it covers 50% or more of the structure of the material weakening 12 of the carrier layer 11.

The multifunctional label 1 thus forms an advantageous combination of a perforation 22 with a material weakening 12 over the surface. The material weakening 12 can in particular be designed to be depth-selective, as indicated in FIG. 13. The perforation lines in the upper label are matched in shape and position to the area of the material weakening 12 in the transponder inlay 10. The opening of the syringe 30 and triggering of the tamper function or the initial opening proofs of the multifunctional label 1 is preferably designed in such a way that no significant increase in force is required to open the syringe 30. This can be realized, for example, by the adhesive-neutral area 24 between the material weakenings 12, 22, in order to prevent the carrier layer 11 and the label layer 21 from sticking together at this position, thus enabling simplified opening handling. The adhesive-neutral area 24 can be formed, for example, by applying an adhesive neutralizer, which is placed on or in the adhesive layer 25 of the label 20 at the intended position.

Figure 14:
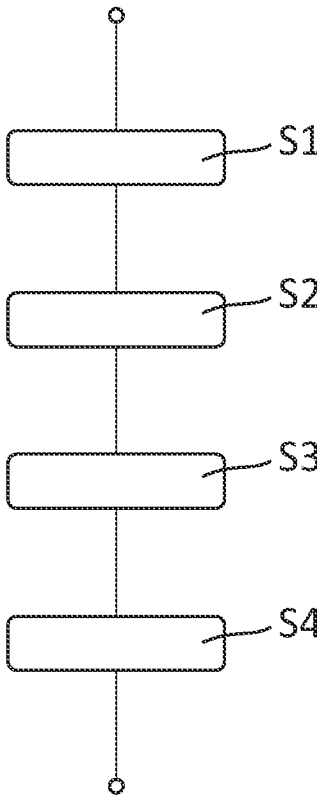
FIG. 14 is a flow chart for a method of manufacturing a multifunctional label according to FIGS. 1-13.

FIG. 14 schematically illustrates a flow chart for a method of manufacturing one embodiment of the multifunctional label 1. In a step S1, the transponder inlay 10 is provided with the electronic unit 13 and the detection loop 16. The local material weakening 12 may be previously or subsequently formed in the carrier layer 11 in the region of the detection loop 16.

For example, in a step S2, the carrier layer 11 may be processed by a laser to remove material in a controlled manner to form the material weakening 12. Alternatively or additionally, the carrier layer 11 can already be provided with the material weakening 12 in the step S1.

In a further step S3, the label 20 is provided with the label layer 21. In the case of the label layer 21, the local material weakening can also be provided in the form of a perforation 22 or formed in a further step, for example by means of a punching machine.

In a further step S4, the transponder inlay 10 and the label 20 are coupled to each other, for example by means of the adhesive layer 25, so that the perforation 22 of the label layer 21 and the material weakening 12 of the carrier layer 11 overlap at least in sections with respect to the lateral extent L of the multifunctional label 1.

The area of material weakening 12 in the carrier layer 11 does not have to extend exclusively to locations without conductive tracks, but can also be located directly below the detection loop 16 and does not influence the function of the antenna structure 14. This is made possible by the use of a depth-selective damage mechanism to generate the material weakening 12 in the carrier layer 11. The material of the carrier layer 11, which is realized for example as a PET film element, is weakened in a controlled manner and completely perforated in areas without conductive tracks or laterally spaced from the detection loop 16. The detection loop 16 realizes a conductive path that is not damaged.

The transponder inlay 10 and the label 20 thus each have a weakening as label layers, which is generated separately. Subsequently, the two label layers are suitably combined. Furthermore, the described sequence can also vary. Furthermore, it is also conceivable that the carrier layer 11 and the label layer 21 are also coupled together first and one or both material weakenings 12, 22 are subsequently introduced in order to realize the multifunctional label 1.

By means of the described embodiments of the multifunctional label 1, reliable protection for pharmaceutical products can be realized in a simple and cost-effective manner. In particular, due to the combination of a digital and an analogue initial opening detection, the multifunctional label 1 enables a particularly secure indication of a tampered and/or already opened container. If the detection loop 16 is damaged, the RFID chip 15 reports during the next interrogation that the tamper loop has been damaged. The way this is reported can be configured when the multifunctional label 1 and the RFID functionality of the transponder inlay 10 are manufactured. In particular, this notification is irreversible. It does not affect the functionality of the RFID chip 15.

By passing the detection loop 16 from a product body to the removable part, for example the syringe cap 31 (or the other way around), the initial opening of a product can be indicated digitally. As soon as the detachable part is removed from the product, the detection loop 16 tears with the perforation 22 in the upper label. Thus, a digital initial opening indication is combined with an analogue initial opening indication in the multifunctional label 1. Since a basic antenna of the RFID functionality remains undamaged, product data including the digital first opening indication can still be read. A customer or patient is thus reliably warned of a product that has already been opened. The multifunctional label 1 can be used with any product that includes a base body as well as a removable part, for example pens, auto-injectors, syringes, cap-lock systems, syringe closure wrap.

The multifunctional label 1 with integrated optical and electronic first opening indication may also be adhered to an auto injector. For example, the label 20 is bonded as a main label on the associated injector body and is guided together with the detection loop 16 of the transponder inlay 10 on at least one side of the injector onto a removable cap of the injector.

Although only a few embodiments of the present invention have been shown and described, it is to be understood that many changes and modifications may be made thereunto without departing from the spirit and scope of the invention.

REFERENCE SIGNS

1 multifunctional label
10 transponder inlay
11 carrier layer of the transponder inlay
12 material weakening of the transponder inlay
13 electronic unit of the transponder inlay
14 antenna structure of the electronic unit
15 chip of the electronic unit
16 detection loop
17 adhesive layer
18 protruding area of the transponder inlay
20 label
21 label layer of the label
22 perforation of the label
23 protruding area of the label
24 adhesive neutral area
25 adhesive layer
30 container/syringe
40 system
L lateral direction of the multifunctional label
R stacking direction of the multifunctional label
S(i) steps of a method for manufacturing a multifunctional label

What is claimed is:

1. A multifunctional label for a multi-part container, comprising:
a transponder inlay having an electronic unit and a detection loop, which are arranged on a carrier layer of the transponder inlay and are electrically coupled to one another, the carrier layer having a local material weakening in a region of the detection loop,
a label with at least one label layer which has a local material weakening, and
an adhesive layer disposed between the carrier layer and the label layer,
wherein the transponder inlay and the label layer are coupled directly or indirectly to one another, so that the material weakening of the label layer and the material weakening of the carrier layer overlap at least in sections with respect to a lateral extent of the multifunctional label, and
wherein an adhesive-free or an adhesive-reduced or an adhesive-neutral area is formed in an area of the material weakening between the carrier layer and the label layer.

2. The multifunctional label according to claim 1, wherein the material weakening of the carrier layer is formed by means of a laser.

3. The multifunctional label according to claim 1, wherein the material weakening of the carrier layer comprises a plurality of circular, slit and/or angular recesses.

4. The multifunctional label according to claim 1, wherein the material weakening of the carrier layer is formed with respect to a depth along a stacking direction of the multifunctional label in coordination with a thickness of the carrier layer, a shape of the detection loop and/or a shape of the electronic unit.

5. The multifunctional label according to claim 1, wherein, with respect to the lateral extent, the material weakening of the carrier layer is formed in a planar manner and the material weakening of the label layer is formed in a linear manner.

6. The multifunctional label according to claim 1, wherein the material weakening of the label layer covers at least 50% of an extent of the material weakening of the carrier layer in relation to the lateral extent.

7. The multifunctional label according to claim 1, wherein the material weakening of the label layer comprises a perforation, a slit and/or a punching.

8. The multifunctional label according to claim 1, wherein the transponder inlay and the label are formed in coordination with the container so that, with respect to an applied state of the multifunctional label on the container, the carrier layer and the label layer are coupled in sections to a first part and a second part of the container and the material weakenings of the carrier layer and of the label layer are associated with a transition between the first and the second part of the container, so that, when the container applied with the multifunctional label is opened, the transponder inlay and the label can be severed in a predetermined manner in the region of the material weakenings and a portion of the carrier layer and a portion of the label layer are removable together with the first part from the second part of the container.

9. The multifunctional label according to claim 1, wherein the electronic unit comprises an antenna structure and an RFID chip which are signal-coupled to each other.

10. A method of using the multifunctional label according to claim 1 comprising:
   providing a container which can be divided into a plurality of parts, having at least a first part and a second part, and
   using the multifunctional label to couple the first part and the second part to one another.

11. A system, comprising:
   a container divisible into a plurality of parts and having at least a first part and a second part, and
   the multifunctional label according to claim 1 coupled to the container such that the carrier layer and the label layer are coupled in sections to the first part and the second part of the container and the material weakenings of the carrier layer and the label layer are associated with a transition between the first and the second part of the container, so that, when the container applied with the multifunctional label is opened, the transponder inlay and the label can be severed in a predetermined manner in the region of the material weakenings and a portion of the carrier layer and a portion of the label layer can be removed together with the first part from the second part of the container.

12. The system according to claim 11 in which the container is formed as a syringe, wherein the first part is arranged as a syringe cap and the second part is arranged as a syringe body, and wherein the carrier layer and the label layer couple the syringe cap to the syringe body.

13. A method of manufacturing a multifunctional label, comprising:
   providing a transponder inlay with an electronic unit and a detection loop, which are arranged on a carrier layer of the transponder inlay and are electrically coupled to one another,
   forming a local material weakening in the carrier layer in a region of the detection loop,
   providing a label with at least one label layer,
   forming a local material weakening in the label layer,
   coupling the transponder inlay and the label to one another so that the material weakening of the label layer and the material weakening of the carrier layer overlap at least in sections with respect to a lateral extent of the multifunctional label,
   providing an adhesive layer located between the carrier layer and the label layer, and
   forming an adhesive-free or an adhesive-reduced or an adhesive-neutral area between the carrier layer and the label layer in a region of the material weakening.

14. The method according to claim 13, wherein forming a local material weakening into the carrier layer and/or forming a local material weakening into the label layer comprises:
   removing material of the carrier layer by means of a laser, and/or
   introducing a perforation, a slit and/or a punch into the label layer.

* * * * *